United States Patent
Hsu et al.

(10) Patent No.: US 8,842,094 B2
(45) Date of Patent: Sep. 23, 2014

(54) CAPACITIVE TOUCH DEVICE CAPABLE OF DISTINGUISHING BETWEEN CONDUCTOR AND NONCONDUCTOR

(75) Inventors: Hsin-Fu Hsu, Tainan (TW); Wei-Wen Yang, New Taipei (TW)

(73) Assignee: Elan Microelectronics Corporation, Hsinchu (TW)

( * ) Notice: Subject to any disclaimer, the term of this patent is extended or adjusted under 35 U.S.C. 154(b) by 83 days.

(21) Appl. No.: 13/287,661

(22) Filed: Nov. 2, 2011

(65) Prior Publication Data

US 2012/0103779 A1     May 3, 2012

(30) Foreign Application Priority Data

Nov. 3, 2010 (TW) ................. 99137790 A

(51) Int. Cl.
     *G06F 3/044*      (2006.01)
     *G06F 3/041*      (2006.01)

(52) U.S. Cl.
     CPC .............. *G06F 3/0416* (2013.01); *G06F 3/044* (2013.01)
     USPC ........................................................ 345/174

(58) Field of Classification Search
     None
     See application file for complete search history.

(56) References Cited

U.S. PATENT DOCUMENTS

| | | | |
|---|---|---|---|
| 2003/0234769 A1 | 12/2003 | Cross et al. | |
| 2009/0256821 A1 | 10/2009 | Mamba et al. | |
| 2009/0303187 A1* | 12/2009 | Pallakoff | 345/169 |
| 2010/0073323 A1* | 3/2010 | Geaghan | 345/174 |
| 2010/0253651 A1* | 10/2010 | Day | 345/175 |
| 2011/0074732 A1* | 3/2011 | Reynolds | 345/174 |
| 2011/0199327 A1* | 8/2011 | Shin et al. | 345/173 |
| 2012/0098788 A1* | 4/2012 | Sekiguchi | 345/174 |

FOREIGN PATENT DOCUMENTS

| | | |
|---|---|---|
| CN | 1675653 A | 9/2005 |
| CN | 101739183 A | 6/2010 |
| CN | 201607714 U | 10/2010 |
| TW | 201005614 A1 | 2/2010 |

* cited by examiner

*Primary Examiner* — Srilakshmi K Kumar
*Assistant Examiner* — Lisa Landis
(74) *Attorney, Agent, or Firm* — Muncy, Geissler, Olds & Lowe, P.C.

(57) ABSTRACT

A capacitive touch device capable of distinguishing conductor and nonconductor includes a flexible sensor layer receiving a first driving signal, an elastic insulation layer below the flexible sensor layer, and an electrically conductive layer below the elastic insulation layer and receiving a second driving signal synchronous but out of phase to the first driving signal. The flexible sensor layer generates a capacitance variation responsive to an object touching thereon, for identifying the object as a conductor or a nonconductor.

13 Claims, 5 Drawing Sheets

CAPACITIVE TOUCH DEVICE CAPABLE OF DISTINGUISHING BETWEEN CONDUCTOR AND NONCONDUCTOR

FIELD OF THE INVENTION

The present invention is related generally to a touch device and, more particularly, to a capacitive touch device capable of distinguishing between conductor and nonconductor.

BACKGROUND OF THE INVENTION

FIG. 1 is a cross-sectional view of a conventional capacitive touch device, in which a sensor layer 10 is coated with an adhesive 12 thereon, for a protective layer 14 to adhere thereto to prevent users' direct contact with the sensor layer 10. The sensor layer 10 is constructed from a multi-layer printed circuit board, and has X-axis and Y-axis sensor traces for generating a capacitance variation responsive to an object touching thereon. The lower surface of the printed circuit board is for circuit wiring and mounting of devices, such as a detector 16. The detector 16 is to detect the capacitance variation taking place at the sensor layer 10. When a finger 18 touches the protective layer 14, the capacitance variation that the detector 16 detects from the X-axis and Y-axis sensor traces will have a distribution over the X-axis and Y-axis as shown in FIG. 2. The equivalent capacitance established by the human finger 18 and the sensor layer 10 increases the capacitance detected by the detector 16, so the position of the finger 18 can be identified by referring to the capacitance variation. The foregoing conventional approach, however, can only work with the capacitance variation caused by human fingers or conductors sized in a particular range, and is not useful to the cases where nonconductors are involved. As another defect, the conventional approach is limited by the thickness of the protective layer 14 adhered onto the sensor layer 10. If the protective layer 14 is excessively thick, detection of the detector 16 to the sensor layer 10 in terms of capacitance variation will be degraded.

Therefore, it is desired a capacitive touch device capable of distinguishing between conductor and nonconductor.

SUMMARY OF THE INVENTION

An objective of the present invention is to provide a capacitive touch device capable of distinguishing between conductor and nonconductor.

Another objective of the present invention is to provide a method for a capacitive touch device to distinguish between conductor and nonconductor.

According to the present invention, a capacitive touch device capable of distinguishing between conductor and nonconductor includes a flexible sensor layer receiving a first driving signal, an elastic insulation layer below the flexible sensor layer, and an electrically conductive layer below the elastic insulation layer and receiving a second driving signal synchronous but out of phase to the first driving signal. The flexible sensor layer generates a capacitance variation responsive to an object touching thereon, for identifying the object as a conductor or a nonconductor.

According to the present invention, a method for a capacitive touch device including a flexible sensor layer, an electrically conductive layer and an elastic insulation layer sandwiched between the flexible sensor layer and the electrically conductive layer to distinguish between conductor and nonconductor, applies a first driving signal to the flexible sensor layer, applies to the electrically conductive layer with a second driving signal synchronous but out of phase to the first driving signal, and generates a capacitance variation by the flexible sensor layer responsive to an object touching the flexible sensor layer, for identifying the object as a conductor or a nonconductor.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
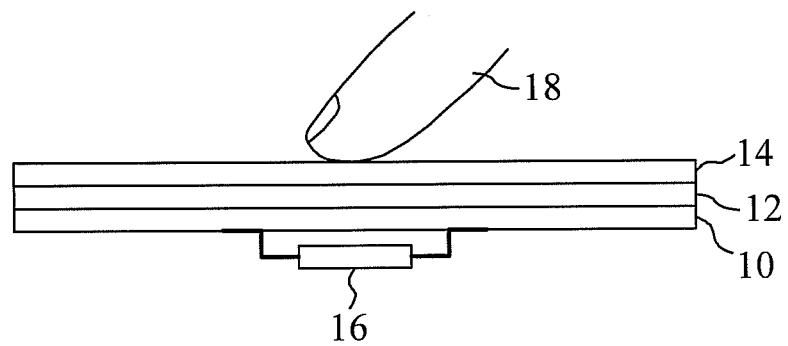
FIG. 1 is a cross-sectional view of a conventional capacitive touch device.
Figure 2:
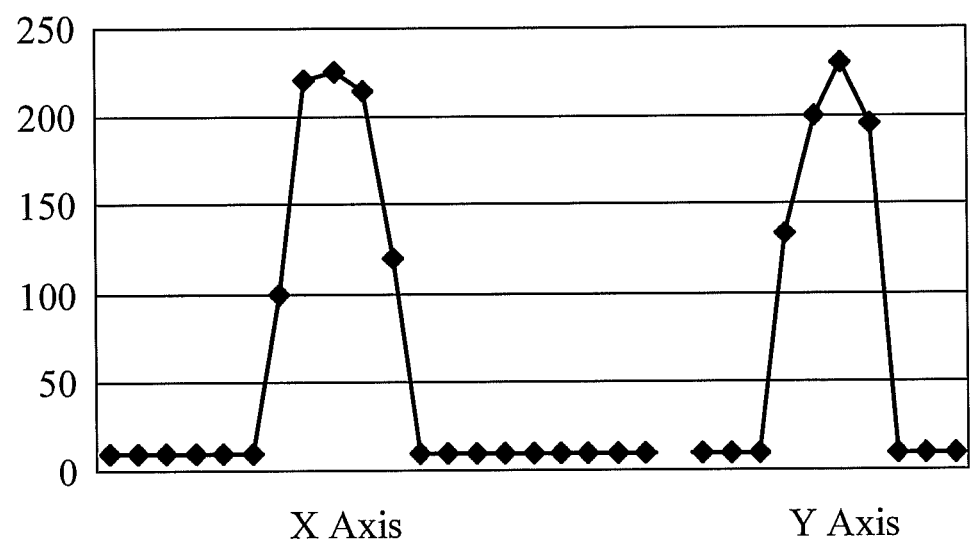
FIG. 2 is a distribution of the capacitance variation over X-axis and Y-axis responsive to a finger touching the conventional capacitive touch device of FIG. 1.
Figure 3:
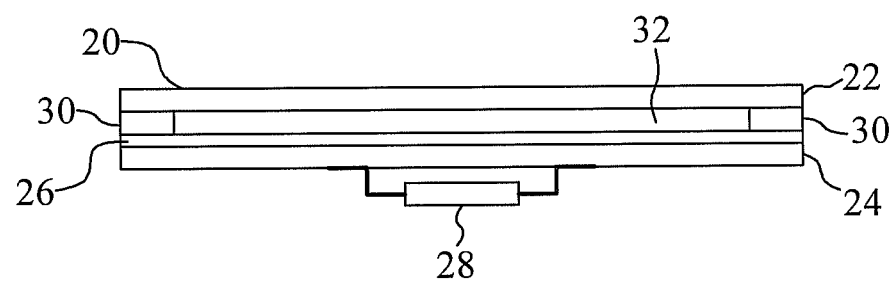
FIG. 3 is a cross-sectional view of a capacitive touch device according to the present invention.
Figure 4:
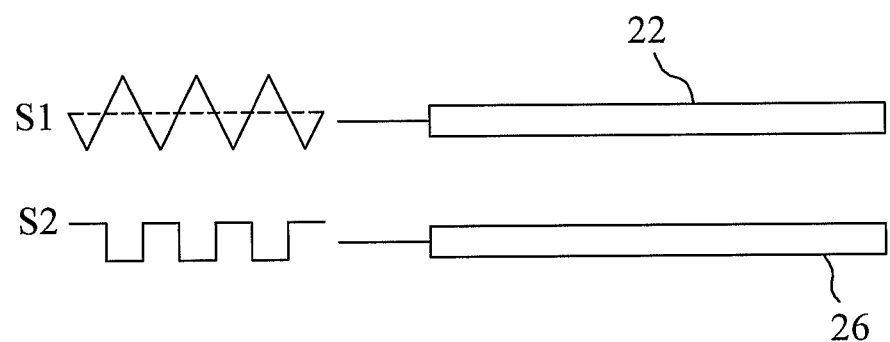
FIG. 4 illustrates the sensing scheme according to the present invention.

FIG. 3 is a cross-sectional view of a capacitive touch device according to the present invention and FIG. 4 illustrates a sensing scheme according to the present invention. In the capacitive touch device 20, the upmost layer is a flexible sensor layer 22, which includes a sensing area established by X-axis and Y-axis sensor traces, and is covered by a protective film, and the bottommost layer is a single-layer, double-faced printed circuit board 24. The printed circuit board 24 has an upper surface covered by an electrically conductive layer 26 made of copper foil and corresponding to the sensing area in size, and a lower surface for circuit wiring and mounting of devices, such as a detector 28. Between the flexible sensor layer 22 and the electrically conductive layer 26, there is a sealed space defined by a frame 30 together with the flexible sensor layer 22 and the electrically conductive layer 26 where an elastic insulation substance 32 is enclosed to form an elastic insulation layer. When the capacitive touch device 20 receives a pressure caused by a touch, the flexible sensor layer 22 deforms at the touched point and moves toward the electrically conductive layer 26. When the pressure caused by the touch is dismissed, the elasticity of the elastic insulation substance 32 makes the flexible sensor layer 22 restored. The elastic insulation substance 32 may be a fluid or a solid-state elastomer. Preferably, the frame 30 is formed by cured adhesive. Preferably, the elastic insulation substance 32 is air, so as to minimize material cost. In other embodiments, the elastic insulation layer 32 is constructed from a solid-state elastomer alone, without using the frame 30. Referring to FIG. 4, for detecting the mutual capacitance variation between the flexible sensor layer 22 and the electrically conductive layer 26, in a method according to the present invention, a driving signal S1 is applied to the flexible sensor layer 22 while a signal S2 synchronous but out of phase to the driving signal S1 is applied to the electrically conductive layer 26. This method facilitates lowering the self-capacitance of the flexible sensor layer 22 to the ground plane, so as to effectively minimize the effect of the self-capacitance, thereby enhancing the mutual capacitance variation and improving the sensitivity.

Figure 5:
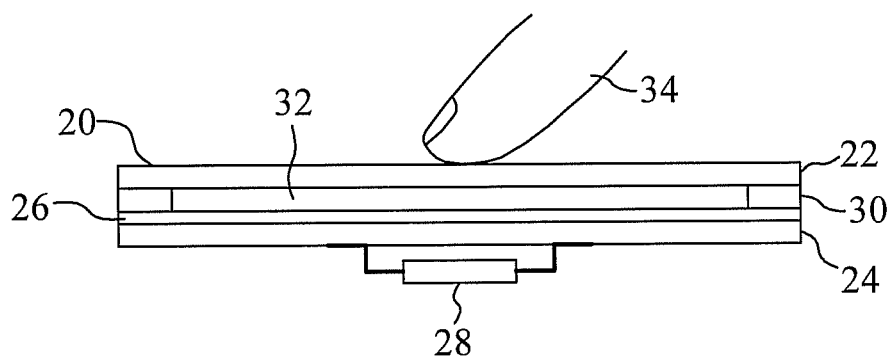
FIG. 5 depicts a finger touching the capacitive touch device of FIG. 3.
Figure 6:
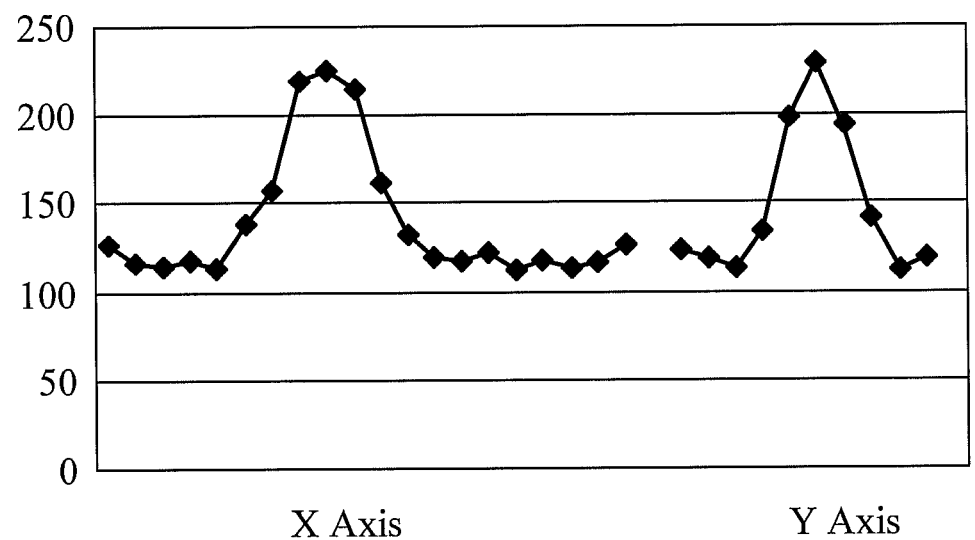
FIG. 6 is a distribution of the capacitance variation over X-axis and Y-axis responsive to a finger touching the capacitive touch device of FIG. 3.

FIG. 5 depicts a finger touching the capacitive touch device 20 and FIG. 6 is a distribution of the detected capacitance variation over the X-axis and Y-axis when the finger 34 touches the flexible sensor layer 22. Together with the flexible sensor layer 22, the human finger 34 acting as a conductor forms an additional capacitor that is connected in parallel with the existing capacitor formed by the flexible sensor layer 22, so a positive capacitance variation will be detected by the detector 28.

Figure 7:
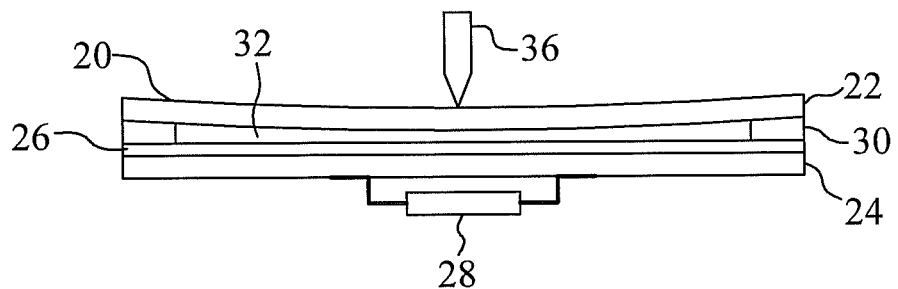
FIG. 7 depicts a nonconductor touching the capacitive touch device of FIG. 3.
Figure 8:
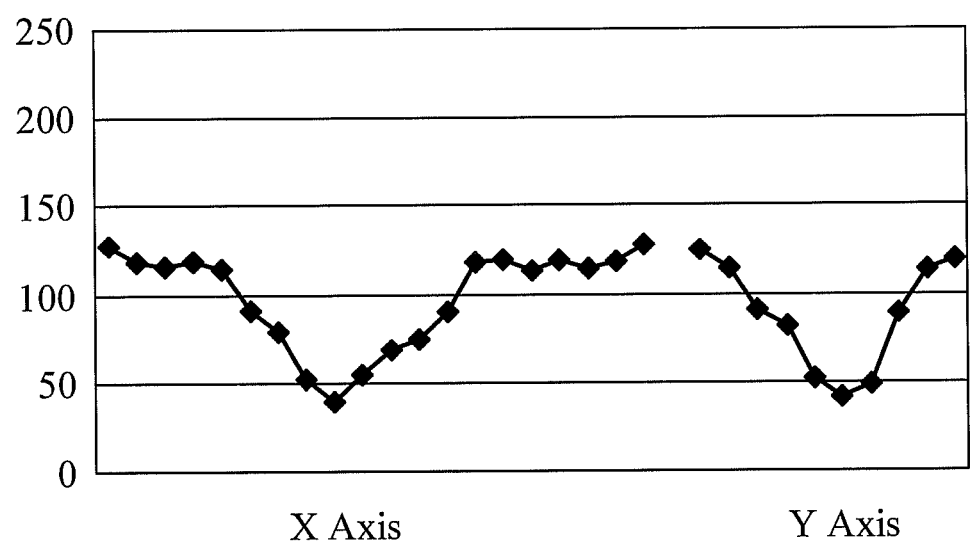
FIG. 8 is a distribution of the capacitance variation over X-axis and Y-axis responsive to a nonconductor touching the capacitive touch device of FIG. 3.

FIG. 7 depicts a nonconductor touching the capacitive touch device 20 and FIG. 8 is a distribution of the detected capacitance variation over the X-axis and Y-axis by the detector 28 when the nonconductor 36 touches and presses the flexible sensor layer 22. Responsive to the downward pressure caused by the nonconductor 36, the X-axis and Y-axis sensor traces of the flexible sensor layer 22 approach the electrically conductive layer 26 therebelow. Since the flexible sensor layer 22 receives the driving signal S1 and the electrically conductive layer 26 receives the signal S2 synchronous but out of phase to the driving signal S1, the signal S2 acts to decrease the capacitance formed by the flexible sensor layer 22, so the capacitance variation detected by the sensor 28 is negative.

Figure 9:
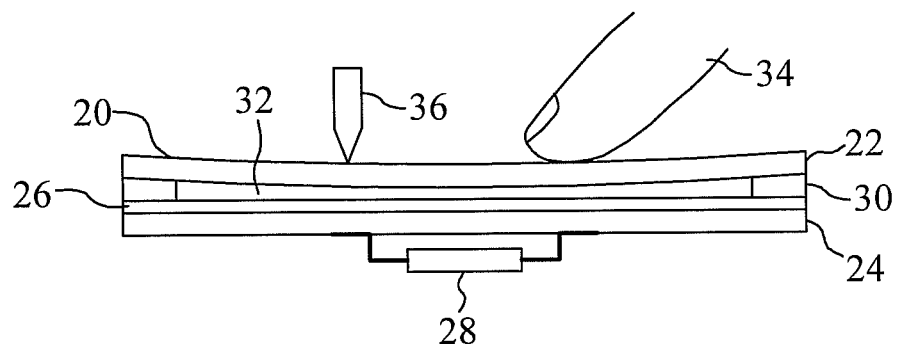
FIG. 9 depicts a finger and a nonconductor touching the capacitive touch device of FIG. 3 at a same time.
Figure 10:
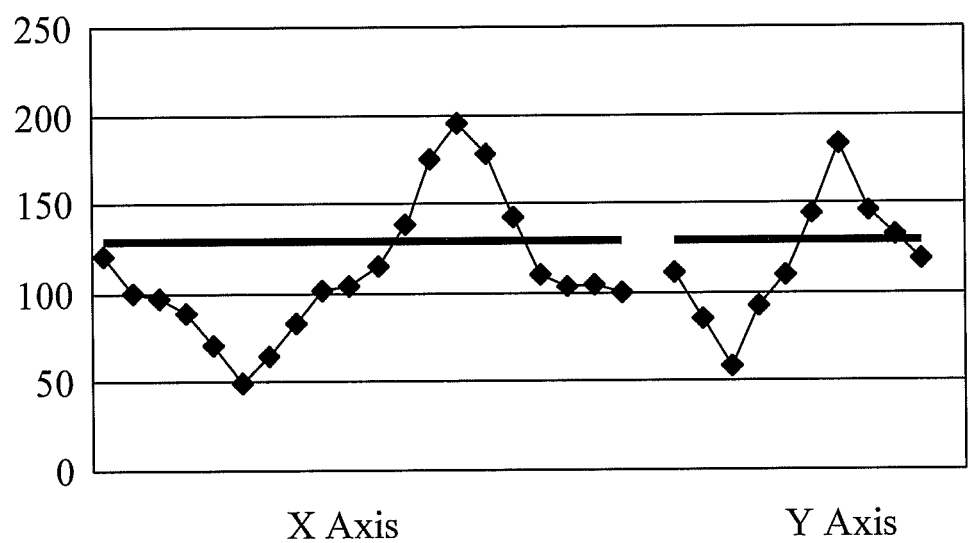
FIG. 10 is a distribution of the capacitance variation over X-axis and Y-axis responsive to a finger and a nonconductor touching the capacitive touch device of FIG. 3 at a same time.

FIG. 9 depicts a finger and a nonconductor touching the capacitive touch device 20 at a same time and FIG. 10 is a distribution of the detected capacitance variation over the X-axis and Y-axis by the detector 28 when the finger 34 and the nonconductor 36 touch the capacitive touch device 20 at a same time. Comparing the two cases shown in FIGS. 5 through 8, it is apparent that, in terms of the equivalent capacitance variation detected by the detector 28, they present opposite properties. The positive capacitance variation (capacitance increase) is identified as the property caused by the finger 34, while the negative capacitance variation (capacitance decrease) is identified as the property caused by the downward pressing nonconductor 36. Thus, this method can easily identify an object as a conductor or a nonconductor and locate the same. Even if the conductor and the nonconductor exchange their places during operation, they can be also identified.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A capacitive touch device capable of distinguishing between conductor and nonconductor, the capacitor touch device comprising:
    a flexible sensor layer receiving a first periodic signal with a first phase;
    an elastic insulation layer below the flexible sensor layer; and
    an electrically conductive layer below the elastic insulation layer and receiving a second periodic signal with a second with a second phase, wherein the first phase is opposite to the second phase;
    wherein the flexible sensor layer generates a capacitance variation responsive to an object touching thereon;
    when the capacitance variation is positive, identifying the object as a conductor; and
    when the capacitance variation is negative, identifying the object as a conductor.

2. The capacitive touch device as claimed in claim 1 further comprising a frame, wherein
    the frame is mounted between the flexible sensor layer and the electrically conductive layer;
    a sealed space is formed within the flexible sensor layer, the frame and the electrically conductive layer; and
    the elastic insulation layer is mounted in the sealed space.

3. The capacitive touch device as claimed in claim 2, wherein the elastic insulation layer is a solid-state elastomer.

4. The capacitive touch device as claimed in claim 2, wherein the elastic insulation layer is a fluid.

5. The capacitive touch device as claimed in claim 4, wherein the fluid is air.

6. The capacitive touch device as claimed in claim 1, wherein the elastic insulation layer is a solid-state elastomer.

7. The capacitive touch device as claimed in claim 1, wherein the flexible sensor layer includes sensor traces covered by a protective film.

8. The capacitive touch device as claimed in claim 1, wherein the electrically conductive layer is a metal layer of a printed circuit board.

9. A method for a capacitive touch device to distinguish between conductor and nonconductor, the capacitive touch device including a flexible sensor layer, an electrically conductive layer, and an elastic insulation layer sandwiched between the flexible sensor layer and the electrically conductive layer, the method comprising the steps of:
    synchronously providing a first periodic signal with a first phase to the flexible sensor layer and providing a second periodic signal with a second phase to the electrically conductive layer, wherein the first phase is opposite to the second phase;
    generating a capacitance variation between the flexible sensor layer and the electrically conductive layer by the flexible sensor layer responsive to an object touching the flexible sensor layer; and
    identifying whether the object is a conductor or a nonconductor according to the capacitance variation;
    when the capacitance variation is positive, identifying the object is a conductor; and
    when the capacitance variation is negative, identifying the object is a nonconductor.

10. The capacitive touch device as claimed in claim 1, wherein a phase difference between the first phase and the second phase is 180 degrees.

11. The capacitive touch device as claimed in claim 1, wherein each of wave peaks of the first periodic signal corresponds to each of wave troughs of the second periodic signal.

12. The capacitive touch device as claimed in claim 9, wherein a phase difference between the first phase and the second phase is 180 degrees.

13. The capacitive touch device as claimed in claim 9, wherein each of wave peaks of the first periodic signal corresponds to each of wave troughs of the second periodic signal.

* * * * *